Nov. 6, 1923.
J. F. DODD
INDICATOR
Filed March 14, 1922     3 Sheets-Sheet 1
1,473,472
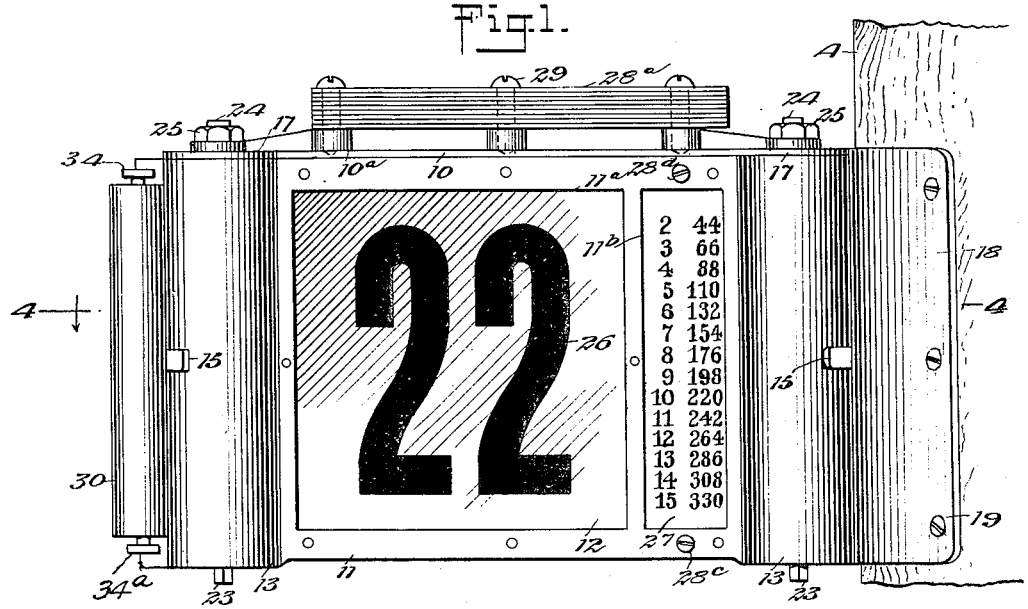
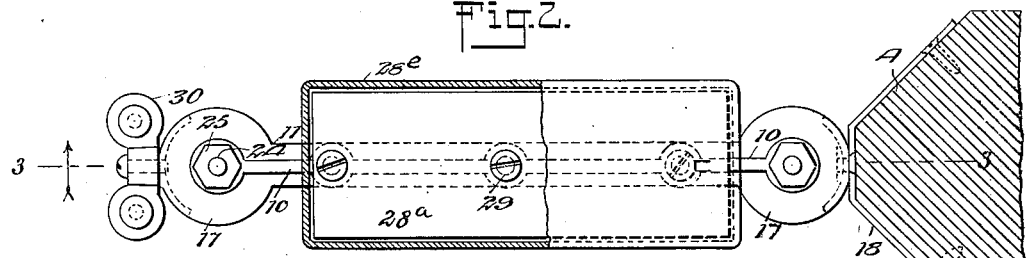
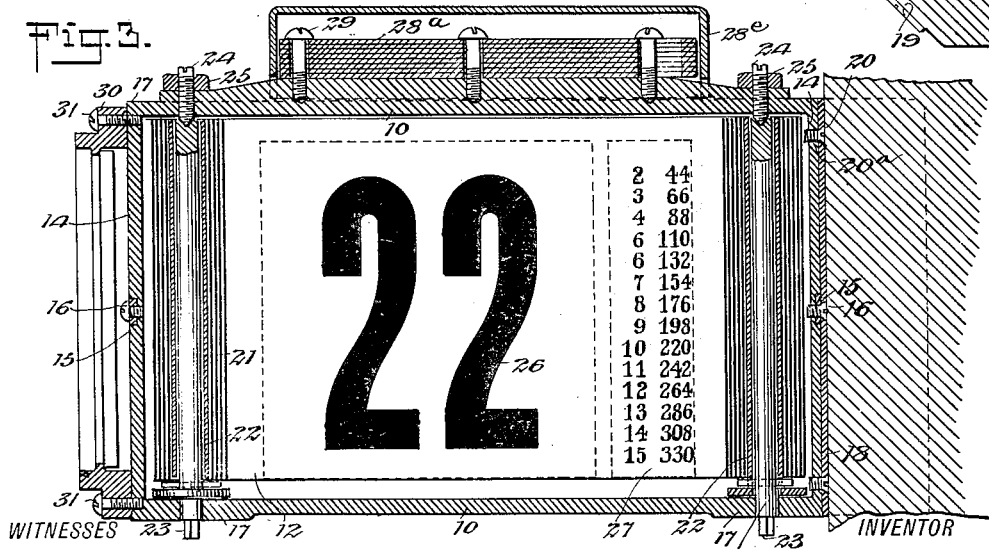
INVENTOR
James Foster Dodd.
BY
ATTORNEYS
WITNESSES Nov. 6, 1923.　1,473,472
J. F. DODD
INDICATOR
Filed March 14, 1922　3 Sheets-Sheet 2
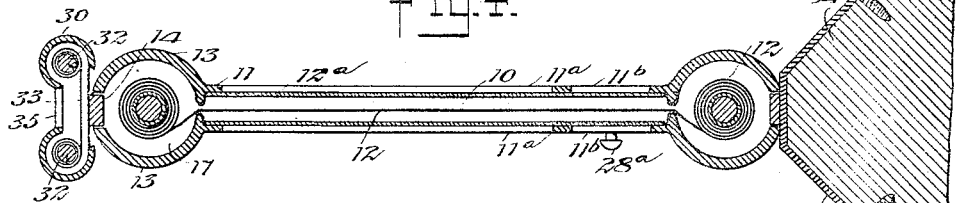
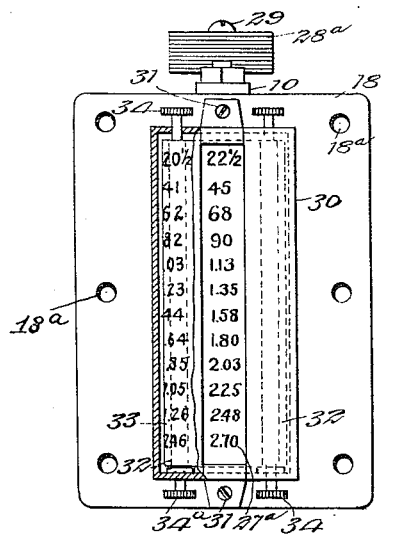
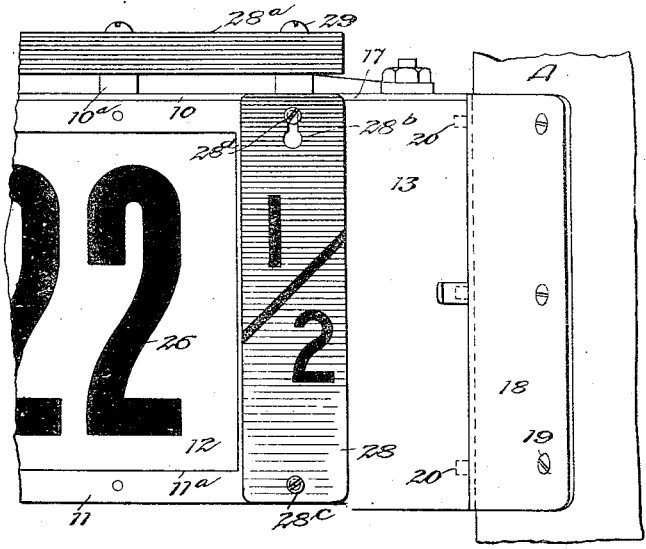
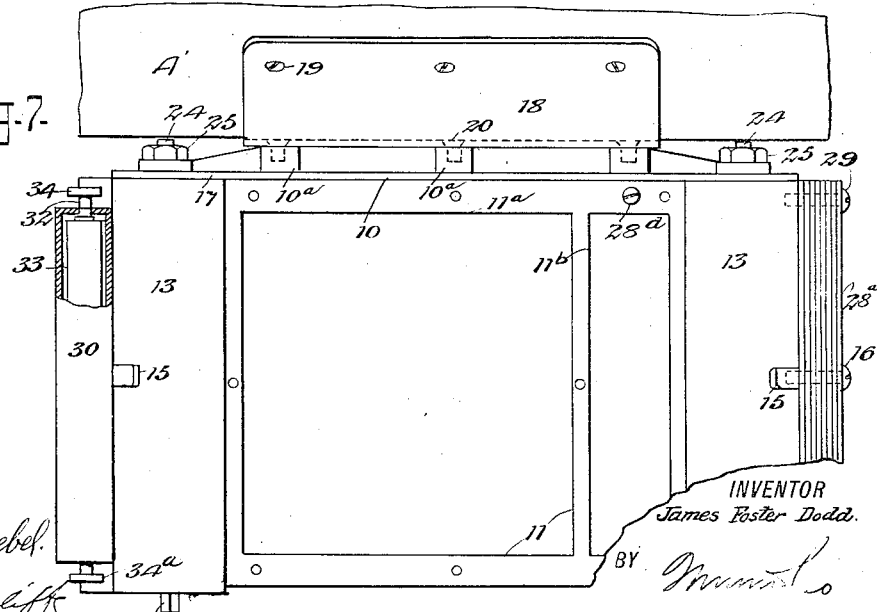
WITNESSES
INVENTOR
James Foster Dodd.
BY
ATTORNEYS Nov. 6, 1923.
J. F. DODD
INDICATOR
Filed March 14, 1922
1,473,472
3 Sheets-Sheet 3
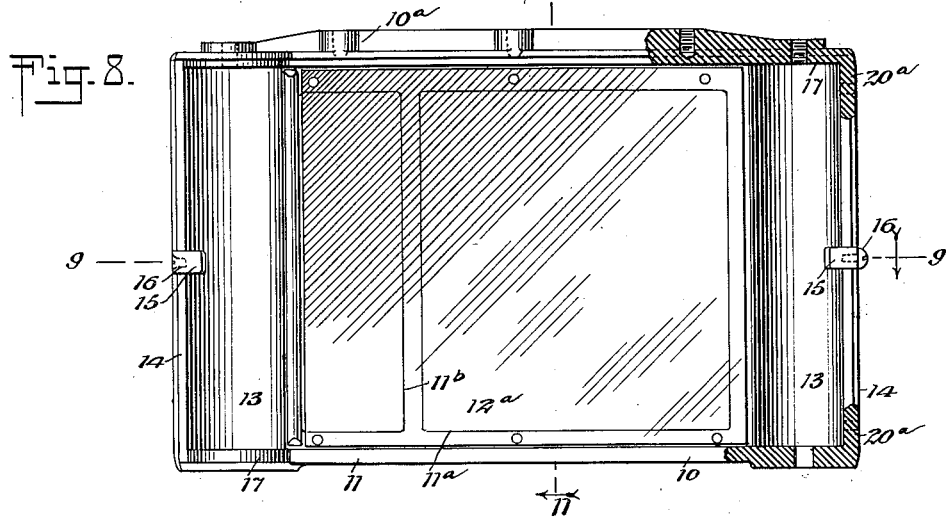
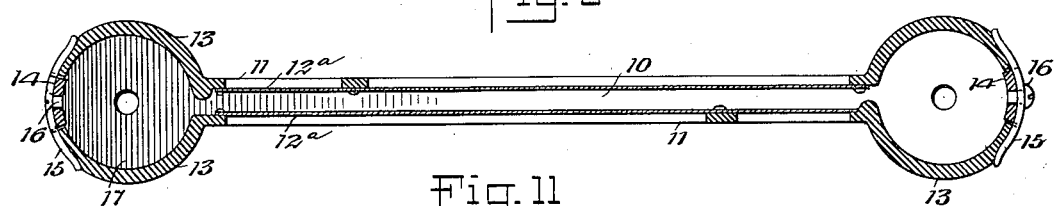
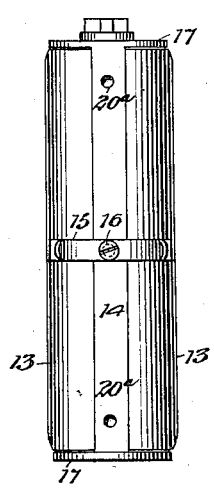
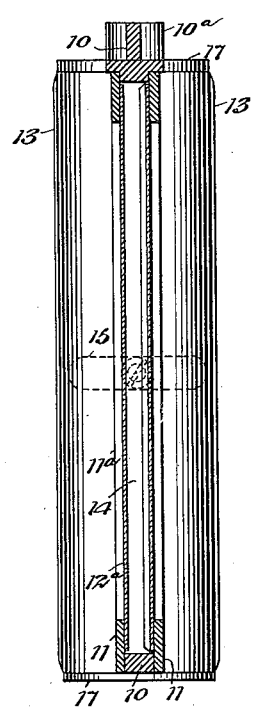
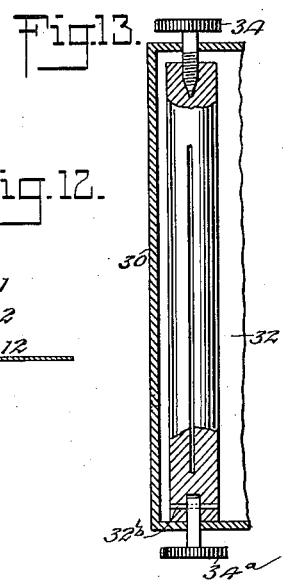
WITNESSES
INVENTOR
James Foster Dodd.
BY
ATTORNEYS Patented Nov. 6, 1923.

1,473,472

UNITED STATES PATENT OFFICE.

JAMES FOSTER DODD, OF DELAWARE, OHIO.

INDICATOR.

Application filed March 14, 1922. Serial No. 543,602.

*To all whom it may concern:*

Be it known that I, JAMES FOSTER DODD, a citizen of the United States, and a resident of Delaware, in the county of Delaware and State of Ohio, have invented a new and Improved Indicator, of which the following is a description.

My invention relates to an indicating device employing a web and rollers on which the web winds.

The general object of my invention is to provide a device of the indicated character which while capable of wide use has particular advantages when embodied in an indicating means for use at gasoline stations for displaying the price of the gasoline and calculated amounts representing various quantities at given prices.

The nature of the invention and its distinguishing features and characteristics will clearly appear as the description proceeds.

Reference is to be had to the accompanying drawings forming a part of this specification, it being understood that the drawings are merely illustrative of one example of the invention.

Figure 1 is a side elevation of an indicator embodying my invention having end support as on any suitable vertical supporting structure;

Figure 2 is a plan view thereof;

Figure 3 is a longitudinal vertical section as indicated by the line 3—3, Figure 2;

Figure 4 is a horizontal section on the line 4—4, Figure 1;

Figure 5 is a fragmentary side elevation showing the indicator arranged for displaying a price including a fraction of a cent;

Figure 6 is an elevation of the outer end of the indicator, parts being broken away and in section;

Figure 7 is a side elevation with one side of the casing removed, a portion of the outer end being in section, the view showing the indicator secured to a support above instead of at an end of the indicator;

Figure 8 is a view of the frame and casing, one side of the casing being removed and a portion of the frame being in section;

Figure 9 is a horizontal section as indicated by the line 9—9, Figure 8;

Figure 10 is an elevation of the inner end of the frame and casing structure;

Figure 11 is a transverse vertical section as indicated by the line 11—11, Figure 8;

Figure 12 is a horizontal section taken through a winding roll and web of the indicator;

Figure 13 is a detail partly in section and partly in side elevation, the view being given to show more clearly the form of the auxiliary web rollers.

In carrying out my invention in accordance with the illustrated example I provide a structure including a central frame 10 and sides 11, the whole constituting a casing. The sides 11 have windows $11^a$, $11^b$, one larger than the other, the windows being covered at the interior by celluloid or equivalent diaphanous or transpicuous material $12^a$ through which may be read matter displayed on a web 12. The ends 13 of the casing sides 11 are semi-circular and the outer edges abut against vertical end members 14 on the frame 10. Curved transverse fastener clips 15 are secured as by screws 16 to the members 14 and overlap the adjacent edge portions of the casing ends 13. The top and bottom of the frame 10 have disks 17 forming with said ends 13 and the members 14 an enclosure for rollers on which the web 12 winds as hereinafter explained.

A bracket 18 is provided for supporting the casing structure and formed with holes $18^a$ (Fig. 6) to receive fastening screws 19 for securing the bracket to any convenient supporting structure A as in Figures 1 to 4 or to an overhead horizontal support A' as in Figure 7. Fastening screws 20 are provided to be passed through holes $20^a$ in that frame member 14 at the inner end of the frame 10 when the bracket is to be secured to the end of the structure, said screws being adapted to be passed vertically as in Figure 7 through enlarged threaded portions $10^a$ in the top bar of the frame 10 when the bracket 18 is secured to an overhead support A'.

In the ends of the structure are mounted vertical rollers 21 to which the respective ends of the web 12 are secured as by split tubes 22 which clip the web to the roller. The lower ends of the rollers 21 project through the bottom disk 17 of the frame 10 and are squared to receive a turning key as indicated at 23. At the top the rollers are journaled by vertical centering screws 24 that extend downwardly through the top of the frame 10 and are provided with nuts 25. The web 12 is made opaque so as to display at the winows 11ª, 11ᵇ the indicating matter produced on both sides of the web. Said web may bear for example amounts representing the different prices of gasoline, there being indicated at 26 the numeral 22 which is adapted to be displayed at the larger windows 11ª. On the web adjacent to each indicated price 26 is a vertical column as at 27 representing the cost of given quantities of gasoline at the price indicated at the larger window, said column being adapted to be displayed at the smaller window 11ᵇ alongside the given price. The illustrated columns 27 represent the price of gasoline in quantities from two to fifteen gallons at 22¢ a gallon.

When the price includes a fraction of a cent such as 22½¢ a gallon for gasoline, I provide a cover plate 28 attachable to the structure over the small windows 11ᵇ and bearing, for example, the fraction ½ so that said fraction will read in connection with the indicated price 26, as for example, 22½. A plurality of plates is provided bearing fractional price factors and these plates may be supported at the top of the structure as indicated at 28ª in Figures 1, 3 and 5, the reserve plates being secured by screws 29 passing through holes therein and into threaded sockets in the enlarged portions 10ª at the top when the bracket 18 is secured to a vertical upright A, said reserve plates 28ª being secured at the end of the structure in lieu of the bracket 18 when the bracket 18 is disposed at the top of the structure as in Figure 7.

For attaching the plate 28 over a window 11ᵇ said plate may be secured by a screw 28ᶜ at the one end, a key hole slot 28ᵇ being provided at the other end to engage the screw 28ᵈ. Thus, the plate may be positioned by engaging the screw 28ᵈ in the key hole slot 28ᵇ and the fastening completed through the medium of the screw 28ᶜ. A cover 28ᵉ may be dropped over the reserve plates 28ª to rest upon and engage the top bar of the frame 10 as shown in Figures 2 and 3.

With the fraction plate 28 covering the windows 11ᵇ and therefore covering the tabulation column 27, reading of the tabulations is provided for at the outer end of the structure for which purpose a case designated generally 30 is provided and secured to said outer end as by screws 31 passing into the adjacent end upright member 14 of the frame 10. Within the case 30 is a pair of vertical rollers 32 on which winds a web 33 bearing columns of figures 27ª having different price marks at the top thereof and amounts representing the cost of different quantities of gasoline at said price. The rollers 32 are journaled by a centering screw 34 at the top extending through the top of the casing 30 and at the bottom by a headed pin 34ª secured by a transverse pin 32ᵇ to each roller 32. The screw 34 may be turned sufficiently into the upper end of the roller 32 to exert friction on the top of the case 30 desired for tensioning the web 33. Similarly, the screws 24 may be employed for increasing friction on the rollers 21 for tensioning the web 12. The pin 32ᵇ or equivalent means prevents the rollers 32 from slipping on the pin 34ª.

It will be obvious that various matter may be displayed on the webs 12 and 33 according to the use to which the indicating device is to be put.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In an indicator of the class described, a web bearing matter to be displayed, rollers on which said web may wind, a structure in which said rollers are adapted to turn and including a frame provided with circular ends at the top and bottom thereof, and a removable side presenting windows for said display matter on the web for each side of said frame, said sides enclosing both said web and said rollers, together with means at the ends of said sides in co-action with said frame for clamping said sides on said frame.

2. In an indicator of the class described, a web bearing matter to be displayed, rollers on which said web may wind, a frame having circular ends at the top and bottom mounting said web and rollers, the rollers being arranged between a pair of said circular ends, a removable casing having windows for said displaying matter on the web encircling said frame, means passing through the ends of said casing for clamping the same to the frame, and a bracket detachably secured to said frame for supporting the frame on a support.

3. In an indicator of the class described, a central frame, sides secured to said frame and having semi-circular ends, the frame having vertical members at the ends disposed between the outer edges of said semi-circular ends, rollers mounted on said frame and encased by said semi-circular ends of the sides, a web secured to said rollers to be moved thereby, and means on said vertical frame members to engage said semi-circular ends.

4. In an indicator of the class described, a central frame, the frame having vertical members at the ends, rollers mounted on said frame adjacent to said vertical members, a web secured to said rollers to be moved thereby, said sides having end formations coacting with said vertical frame members to encase said rollers, a supporting bracket for said structure, and means to secure said bracket to said vertical frame members.

5. In an indicator of the class described, a central frame presenting circular ends at the top and bottom, rollers adapted to wind a web arranged in said frame, each roller being arranged between one top and one bottom circular end, a casing comprising a pair of similarly constructed sections, each having semi-circular ends, and a window between the ends enclosing said frame and rollers, clamping means at the ends of said sections for clamping the sections on the frame; a bracket securable either to the side or top of said frame for supporting the indicator either from a side or an overhead support.

J. FOSTER DODD.